United States Patent
Dastidar

[11] Patent Number: 5,850,308
[45] Date of Patent: Dec. 15, 1998

[54] SCANNING ARRANGEMENT FOR FAST ACCESS OF MEMORY AND DISPLAY

[76] Inventor: Pranab Dastidar, F-3 Rajkunj Co-Op HSG Soc., Chembur Bombay 400 074, India

[21] Appl. No.: 457,824

[22] Filed: Jun. 1, 1995

[51] Int. Cl.$^6$ .................................................. G02F 1/29
[52] U.S. Cl. .................. 359/315; 359/317; 359/323; 359/222; 359/224; 359/245; 359/264; 359/298; 372/66
[58] Field of Search ..................... 359/315, 316, 359/322, 323, 317, 318, 222, 224, 264, 245, 298; 372/66, 70

[56] References Cited

U.S. PATENT DOCUMENTS

| | | | |
|---|---|---|---|
| 3,417,398 | 12/1968 | Lewis et al. | 359/222 |
| 3,666,358 | 5/1972 | Banks | 359/222 |
| 3,872,451 | 3/1975 | McNaney | 359/222 |
| 4,143,948 | 3/1979 | McNaney | 359/298 |
| 4,264,135 | 4/1981 | Lang | 359/264 |
| 4,555,786 | 11/1985 | Byer | 372/70 |
| 4,815,094 | 3/1989 | Cantoni | 372/66 |
| 4,829,532 | 5/1989 | Kane | 372/66 |
| 5,093,747 | 3/1992 | Dorschner | 359/315 |
| 5,101,293 | 3/1992 | Kemeny | 359/315 |
| 5,122,894 | 6/1992 | Grantham | 359/315 |
| 5,212,583 | 5/1993 | Vali et al. | 359/315 |
| 5,227,911 | 7/1993 | Schiller et al. | 359/222 |
| 5,317,446 | 5/1994 | Mir et al. | 359/315 |

*Primary Examiner*—Loha Ben

[57] ABSTRACT

An access system based on piezo-electric transducer assembly or electro-optic device light beam deflector assembly which on application of electric signals deflects light beams, which are then passed through total internally reflecting surfaces to increase the separation between beams, is described. The light beams fall on large area information storage surface, such as optical disk or magnetic disk, for the purpose of reading and writing. The access time to the information is very fast. The nature of the reflected light from the memory surface is detected to read the digital signals stored on the surface as is conventionally done in the art. Except for the small friction-free movements of the piezo-electric transducers there are no moving parts for access to the storage surface. Instead of the memory surface a screen may be placed when tthe light beams can be used after large separation to form a fast display.

3 Claims, 2 Drawing Sheets

SCANNING ARRANGEMENT FOR FAST ACCESS OF MEMORY AND DISPLAY

The invention is not pursuant to any Government contract and no rights are attributable to the Government.

BACKGROUND OF THE INVENTION

The field of the invention is that of scanning of large surfaces with light beams.

This invention relates to fast access and scanning with light beams of large area display screen or of information storage surface. The light beams are initially deflected by mirror mounted on piezo-electric transducer (henceforth written in short as pzt) assembly or light beam deflector assembly using electro-optic devices. The deflection is then followed by a multiple reflection system which has reflectivity and transmittivity control. In the following, the terms information storage surface will often be used for convenience, but it is understood that the surface can also be a screen when the system is used as a display.

DESCRIPTION OF RELATED PRIOR ART FROM THE FIELD OF THE INVENTION

In present practice, optical read only memory disk such as compact disk is rotated and the laser light beam is moved radially to scan the disk surface for reading the information (Ref. Optical Disk Storage, Principles of Modern Optical Systems, Ivan Andonovic and Deepak Uttamchandani, Artech House, Inc., 1989, page 6 and 551). Similarly, magnetic memory disk is rotated and the reading/writing head is moved radially to scan the disk during information retrieval and storage. Because of the rotary and linear mechanical motions, the access times to the addressable locations for information retrieval and storage, which though have become faster over the years, through increased storage densities and higher rotational and linear speeds, are still considerably slow compared to access times for static semiconductor memories. It is the desire of all in the field to have still higher access speeds for mass memories.

The successful scanning arrangement for mass memories used extensively in practice, has been based on fast mechanical movements, because mass memories require large area storage surfaces. Fast direct scanning of large area information storage surfaces with optical beams, where the system is in a compact assembly, has not been successful in practice. It has been known for a long time that light weight sensitive indicators for galvanometers have been based on light beams reflected from light weight mirrors, mounted on the suspension of the galvanometer coil. The light beam is allowed to travel over substantial distances, to obtain magnification of the deflection movement of the coil of the galvanometer. Optical scanning with rotating polygonal mirrors, has been used in laser beam scanners (Ref. Electro-optical Devices and Systems, M. A. Karim, PWS-Kent Publishing Company, Boston,1990, page 308). Optical scanning with mirrors mounted on piezoelectric crystals, has been reported (Ref. Photorefractive devices and applications—H. Rajenbach and J. P. Huignard, Optical Computing, Proceedings of the Thirty Fourth Scottish Universities Summer School in Physics, Edinburgh, 1988, Ed. B. S. Wherrett and F. A. Tooley, Publisher Scottish Universities Summer School in Physics, page 133), but the deflection angles of the beams are small. Fine movements are possible with piezoelectric crystals, with high degree of position accuracy, as has been demonstrated for scanning tunnel microscopy and like systems (Ref. Scanned Probes Old and New, H. Wickramasinghe, AIP Conference Proceedings 241, Scanned Probe Microscopy, Ed. H. Kumar Wickramasinghe, American Institute of Physics, New York, 1991, page 9). For high speeds, the deflections have to be small. Deflection of light beams using prisms made of electro-optic materials (Ref. Engineering Optics, Keigo Iizuka, Springer Series in Optical Science, Springer-Verlag, Berlin, 1983, page 391), such as lithium niobate, potassium dihydrogen phosphate, quartz, (Ref. for materials and their properties, page 280 of book by M. A. Karim, cited before), is feasible under the application of electric fields. The response time is fast. Here too, the change of refractive index is small resulting in small deflections. In order to scan a large surface area, the beams have to be made to travel over long linear distances, to obtain sufficient magnification. Large area projection displays using light beams, have also been reported (Ref. Laser Displays, Manabu Yamamoto and Teiichi Taneda, Advances in Image Pickup and Displays, Vol.2, Ed. B. Kagan, Academic Press, 1975). The criteria of compactness for most applications requiring fast scanning of large surfaces, rules out the use of deflected light beams, if the light beams have to travel long straight linear distances before impinging on the surfaces.

Reasonably fast deflection of light beams over large angles, is possible with the optical analog of the phased array radar. Deflection angles attainable are large. The phase array system gives precise deflection of light in the far field and hence the whole system is not inherently a compact system. The phase array system is complex. Besides, the structure and material properties of the optical array are more stringent than those for the microwave array. There could be problems of focussing the deflected beam at the output side of the array, because of the large angular coverage of the deflection. Use of such beams on a large area memory surface, for access of fine storage points which for high density is of the order of a wavelength, is fairly difficult.

SUMMARY OF THE INVENTION

An object of the invention is to reduce the time for access of optical disk and magnetic disk information storage media, coupled with increased position accuracy, but without the friction associated with mechanical motions of the disk or the detector system. Another object is to achieve a fast large area display by scanning a screen of large surface area, with light beams. A feature is the use of electrically driven tiltable surface, achieved by piezoelectric transducer on which is mounted light generating source or mirror. Another feature, as an alternative, is the use of a electrically driven light beam deflector assembly using electro-optic devices, which deflects the light beams very fast in two dimensions. The angular deflections have to be small for achieving fast response times. Yet another feature, is to increase the initial small physical separation of the light beams to larger separation, by using multiple reflections of the beams in a reflecting system. The exit of the light beams to the information storage surface from the reflecting system, through one of the sides, is achieved by constituting the exit side with different refractive index materials. In one of the configuration, the geometrical shape of the closed reflecting system, changes the angle of incidence of the light beam striking one side which is made up of different refractive index materials. When the angle of incidence is beyond the critical angle of the side, the light beam is reflected by the side and when within the critical angle, the beam escapes to the outside through that side. In another configuration the use of electro-optic materials and impressed electric fields at particular positions on one side, causes change in the refractive index at the position of the applied field, so that the position changes from reflective to transmittive, enabling the light beam to escape outside the reflecting system. In yet another configuration the use of accousto-optic materials and travelling accoustical pulse on one side, causes change in the refractive index at the position of the pulse, so that the position changes from reflective to transmittive, enabling the light beam to escape outside the reflecting system.

DESCRIPTION OF THE DRAWINGS

The above and other features of the invention will now be more particularly described with reference to the accompanying drawings and pointed out in the claims. It will be understood that the particular assemblies and explanations are by way of illustrations only and not as limitations of the invention. The principles and features of the invention may be employed in various and numerous embodiments without departing from the scope of the invention.

Reference is made to the accompanying drawings in which are shown illustrative embodiments of the invention, from which its novel features and advantages will be apparent.

In the drawings:

FIG. 1 is an exploded perspective view, which is not to scale, of the schematic of one form of the light beam separating system, using long internally reflecting cores or tubes.

FIG. 2 is an exploded perspective view, which is not to scale, of the schematic of one form of the light beam deflection system using electro-optic devices.

FIG. 3 is an exploded perspective view, which is not to scale, of the schematic of one form of the light beam separating system using an enclosed box like reflector configuration.

DESCRIPTION OF THE PREFERRED EMBODIMENTS

Figure 1:
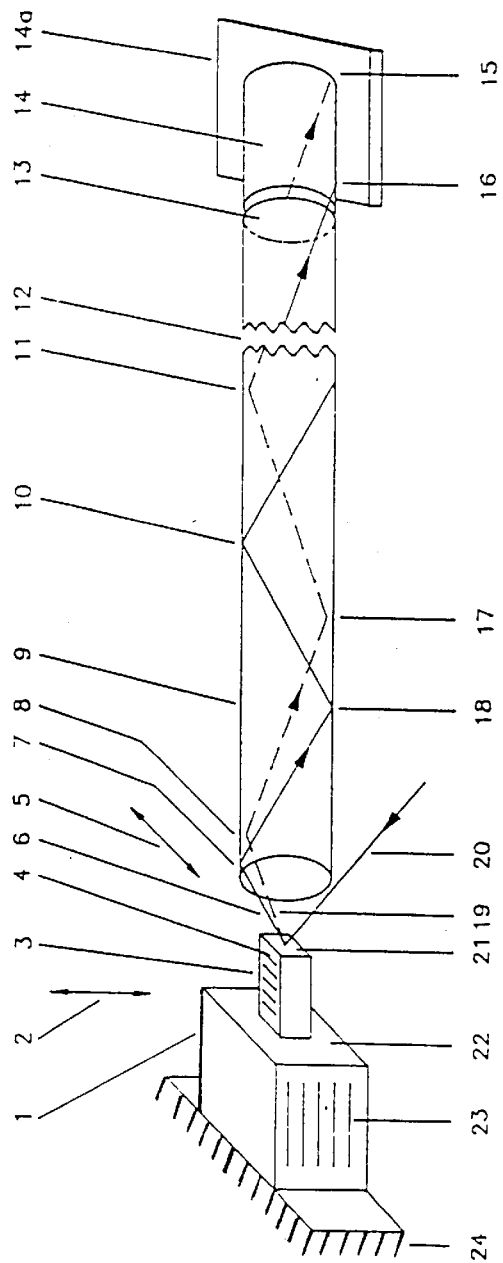

Referring to FIG. 1:

A piezoelectric transducer assembly is shown schematically, consisting of one piezo-electric transducer, 1, capable of oscillating along one axis indicated by 2, and another piezo-electric transducer, 3, capable of oscillating along another axis indicated by, 5, and mounted on pzt, 1, as support, with the assembly held firmly at support, 24. A mirror, 21, is fixed to the end of the assembly. Light generators can also be fixed on the end of the assembly but it is likely to be bulkier and complex with electrical connections, in addition. Electrical signals are provided to metallic contacts on the two pzt elements, one of the two of which to pzt, 1, is indicated on the visible side by a series of parellel lines, 23, and one of the two contacts to pzt, 3, is indicated by another series of parellel lines, 4. A light beam, 20, generated preferably by a laser, is reflected by the mirror, 21, and enters a cylindrical tube or core, 9, of similar configuration as in fibre optics, having a total internal reflecting surface. The light beam, 6, shown by the full line is from one position of pzt, 3, and the light beam, 19, shown by the broken line is from the another position of pzt, 3. The information storage cylinder, 14, is hollow and has the information stored on its internal surface which is scanned by the light beams. Instead of the cylinder, 14, a flat information storage surface, 14a, which is scanned by the same beams, can be used as an alternative. 14, or 14a, can also be screens, when the system is used as display. The two dimensional light beam deflector assembly using electro-optic devices, FIG. 2, can replace the pzt assembly in FIG. 1.

Figure 2:
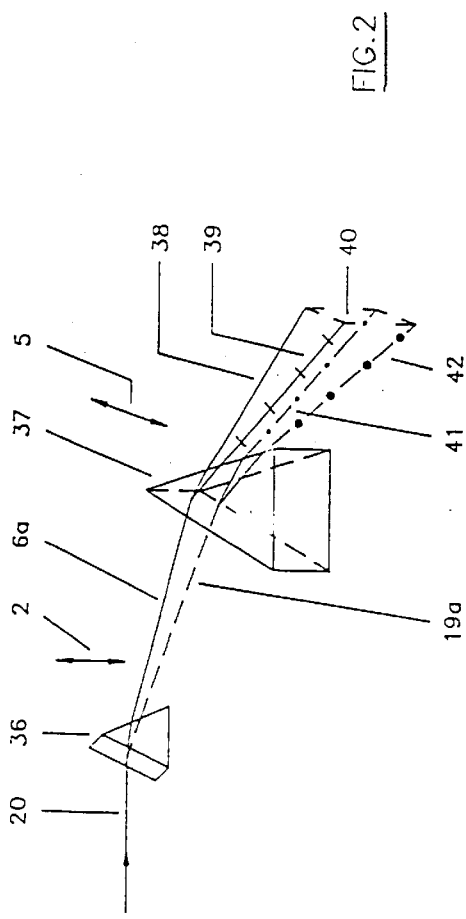

Referring to FIG. 2:

Two prisms, 36, and 37, made of electro-optic materials whose refractive indices can be changed electrically, are placed in two different planes at right angles to each other. The electrodes for applying the electrical field to the prisms are not shown, in order not to clutter up the drawing. The incoming light beam is shown by 20, and the deflected beams, 6, indicated by full line and 19, indicated by broken line, both in the plane of the paper, are for two different electric field states of the prism, 36. The beams, 6, and 19, are at opposite extreme positions in the direction of 2. The light beams, 38, indicated by full line and 39, indicated by broken line with small right angle lines in between, in the plane at right angles to the plane of the paper, are the deflected beams from the beam, 6, for two electric field states of the prism, 37. The beams, 38, and 39, are at opposite extreme positions in the direction of 5. The light beams, 41, indicated by broken line with small dots in between and 42, indicated by broken line with larger dots in between, also in the plane at right angles to the plane of the paper, are the deflected beams from beam, 19, for the same two different electric field states of the prism, 37. The beams, 41 and 42, are at opposite extreme positions in the direction of 5. The scanning area, 40, which the light beams can cover for all voltages applied to prisms, 36, and 37, is also indicated. The two dimensional light beam deflector assembly using electro-optic devices, can replace the pzt assembly in FIG. 1.

Figure 3:
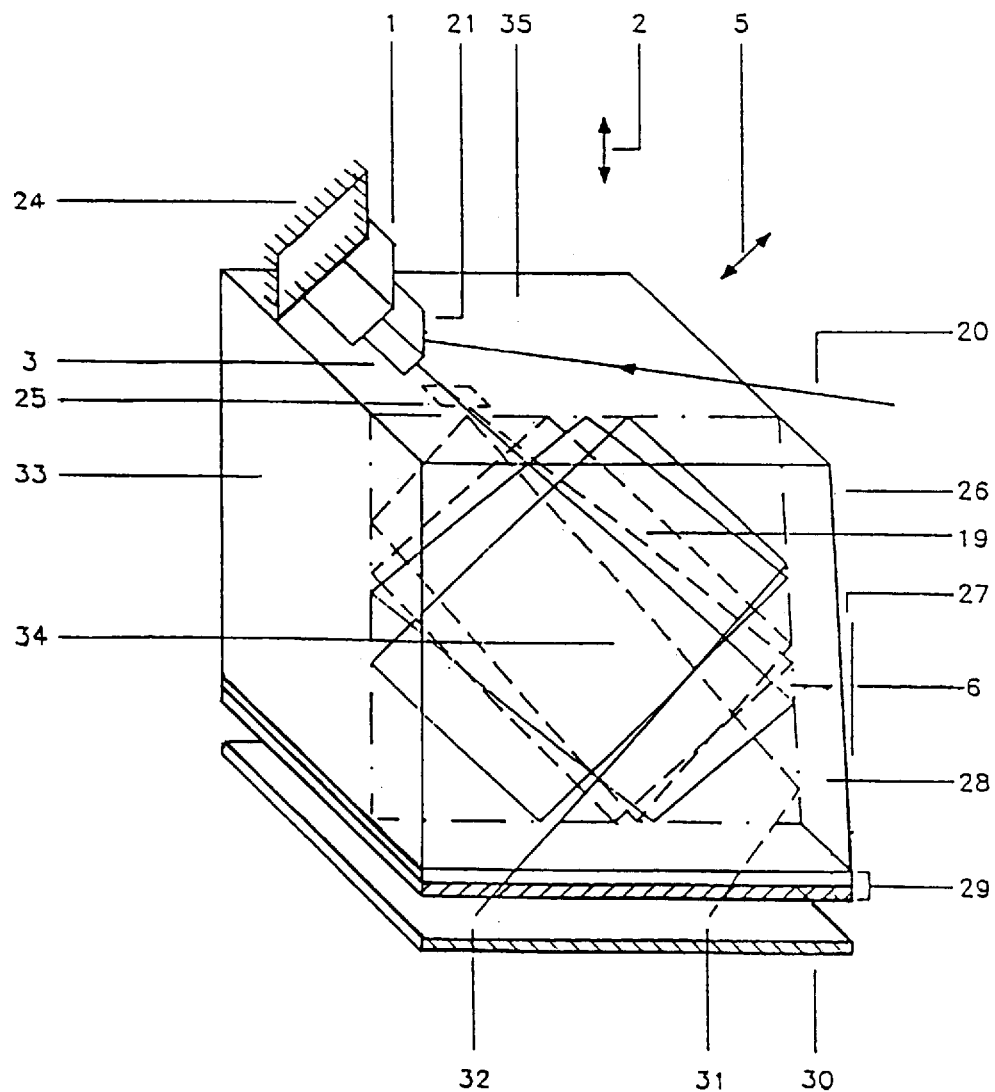

Referring to FIG. 3:

The pzt assembly is of the same type as in FIG. 1. The two dimensional light beam deflector assembly using electro-optic devices, of FIG. 2, can replace the pzt assembly in FIG. 3. Three plane mirrors 26, 33, 35, with reflecting surfaces along with the side, 29, having layers of materials with different refractive indices, are assembled in the shape of a box. Two more plane mirrors can be placed at the front and back of the box, if required. While the mirror, 35, and the side, 29, are perpendicular to the mirror, 33, the mirror, 26, is tilted inwards by a small angle from perpendicularity. The tilt angle from vertical is indicated by 27. The information storage surface, 30, has the storage surface at the top where the light beams fall. For a display, 30, is a screen. A light beam, 20, generated, preferably by a laser is reflected by the mirror, 21, with the reflected light rays indicated by 6, and 19, from two positions of the mirror, entering the box, through a small area, 25, on the mirror, 35. The area, 25, is made transmitting or partially transmitting for beams from outside the box and reflecting for any beam striking the area from inside the box. The surface, 34, on which lie the light beams, shown undergoing multiple reflections in the box, is inside the front outer face, 28, of the reflecting box.

When the light beam deflector assembly, using electro-optic devices, FIG. 2, is used instead of the pzt assembly, the deflected beams like 38, 39, 41, 42, enter the box through the small area, 25.

The features of the light beam deflector assembly using electro-optic devices, are explained as follows:

In FIG. 2 the prism, 36, deflects the light beam, 20, in the direction of the axis indicated by 2. The amount of deflection is controlled by the electric field created in the material of the prism, 36, by the voltages applied to electrodes (not shown) on the prism, 36. The beams, 6, and 19, indicate the extreme positions of the deflected beams along axis, 27 with the other deflected beams of 20, always lying in between the positions of the beams, 6, and 19. Prism, 37, is along the axis indicated by 5, which is perpendicular to the axis, 2, and deflects the light beam, 6, in the direction of the axis, 5. The amount of deflection is controlled by the electric field created in the material of the prism, 37, by the voltages applied to electrodes (not shown) on the prism, 37. The two extreme deflection positions along axis, 5, of the beam, 6, are indicated by the light beams, 38, and 39, with the other deflected beams of 6, always lying in between the positions of the beams, 38, and 39. Likewise the prism, 37, deflects the light beam, 19, in the direction of the axis, 5. The amount of deflection is controlled by the electric field created in the material of the prism, 37, by the voltages applied to electrodes (not shown) on it. The two extreme deflection positions along the axis, 5, of the beam, 19, are indicated by the light beams, 41, and 42, with the other deflected beams of 19, always lying in between the positions of the beams, 41, and 42. Thus, through the control of the voltages applied to the electrodes of the two prisms, 36, and 37, the light beam can be positioned anywhere in the two dimensions of the area indicated by 40. Since the rate of change of the applied voltages can be very fast, the positioning of the light beams in two dimensions can be extremely fast. The positioning can be much faster than can be achieved with piezoelectric transducers.

The features of the access arrangement are explained as follows:

In FIG. 1, the piezo-electric transducers, 1, and 3, are excited by electrical signals impressed on metallic contacts like 4, and 23, on the pzts. The electrical signals cause the mirror face, 21, to be tilted along the two axes of deflection, 2, and 5, because of the cantilever action of pzt, 3, on pzt, 1, as support and the cantilever action of pzt, 1, on its rigid support, 24. For quick memory access the pzts must be capable of deflecting fast, which restricts the movement of the mirror, 21, to small values. The angular deviations of the reflected light beams from the mirror, 21, will be very small. The angular separation between two typical beams 6, and 19, shown in the figure, has been kept a little large for ease of viewing.

It is possible to have the pzt assembly in the form of two independant pzts with mirrors mounted on both and signals applied to both. Each pzt is made to deflect along different axes. The beam deflected from one falls on the other with the outgoing beam from the assembly deflected in two dimensions.

The light beam, 6, shown with full line is for one extreme position, along 5, of the mirror, 21, due to the application of the largest signal of one polarity on pzt, 3, and the light beam, 19, shown with broken line is for the other extreme position, along 5, of the mirror due to the largest signal of the opposite polarity on pzt, 3. It is assumed that during the movements to the extreme positions of pzt, 3, the signal on pzt, 1, is held constant but in another mode of operation both pzts can be made to move simultaneously.

The beam, 6, enters the optical core or tube, 9, and gets reflected at points 7, 18, 10, and so on and the beam, 19, enters the same optical core or tube and gets reflected at points 8, 17, 11, and so on. It is seen that the distances between the reflection points for the full and broken line beams increase with increasing number of reflections. Thus the distance between the points 11, and 10, is larger than between 17, and 18, which in turn is larger than the distance between 8, and 7. It is as if the light beams reflected from the mirror, 21, are allowed to travel along straight lines for long distances to increase the linear separation between them. But instead of performing the increase in free space, it is accomplished in a desirable confined geometry. The distance between adjacent reflection points will be large if the diameter of the optical core or tube is large. After many reflections from a long (indicated by the break at 12) optical core or tube, the beams emerge from the end, 13, of the core or tube with large linear separation and enter the hollow information storage cylinder, 14. The full line and the broken line beams after traversing the core or tube are shown to strike the surface of 14, at 16, and 15, respectively.

The diameter of the core or tube is chosen to allow the beams from the extreme positions of the mirror, 21, to escape from the core or tube after identical number of reflections, to strike the information storage surface. If identical number of reflections are not ensured, some of the beams may emerge in different directions, thereby, either not striking the storage surface where the information is stored or striking the surface in an undesired sequence. Though the angular separation of the beams is very small, the linear dimension of the information storage surface scanned is large, which means that the system is capable of speedily accessing large amounts of stored information.

When the signal on pzt, 1, is changed, its face, 22, will tilt in the direction of 2. The trajectory of the reflected beams from the mirror, 21, due to the subsequent deflections of pzt, 3, will be in different position in space from that of the trajectory of the beams from 6, to 19, which was the result from the earlier position of pzt, 1. Therefore, the beams striking the storage surface, 14, will follow a different trajectory to that followed by beams from 6, to 19. The combined deflection of pzts 1, and 3, can scan a good part of the internal surface of 14. The part on the storage surface, 14, which can be scanned, is utilized for information storage. Any desired point on the information storage surface can be accessed by the simultaneous application of the appropriate voltages to the two pzts, 3, and 1, to generate the needed tilt of the mirror, thus permitting fast random access to the information storage surface.

The storage medium thus far described is cylindrical. As an alternative, it can also be flat as indicated by 14a. The beams emerging from the optical core or tube would strike the flat storage surface in two dimensions over a large area, to enable reading and writing of large amounts of information.

Instead of the storage surface, a screen may be placed when fast and large display is desired.

The scan trajectories are more complex than indicated in the simplified illustration and description above. To obtain scan trajectories which may be standardised after evolution of the technology for two dimensional deflection of light beams using pzt assemblies, more complex movements of the mirror, 21, will be required, which will have to be ensured by appropriate design of the pzt assembly and combination of signals simultaneously applied on the pzts.

Long lengths of large diameter optical cores are inflexible and occupy large space which is inconvenient. Long lengths of small diameter flexible optical fibre coiled for saving space, introduce other difficulties for beam separation, on account of the small diameter of the fibre and the curvature of the coil. Hence, another scheme is illustrated in FIG. 3.

The features of the second scanning system are explained as follows:

In FIG. 3, the piezoelectric transducer assembly and the mirror arrangement on it are the same as in FIG. 1. The electrical signals cause the mirror face, 21, to be tilted along the two axes of deflection, 2, and 5, because of the cantilever action of pzt, 3, on pzt, 1, as a support and that of pzt, 1, on its rigid support, 24. For quick access to information storage surface, the pzts must be capable of deflecting fast, which restricts the movement of the mirror, 21, to small values. The angular deviation of the reflected light beams from the mirror, 21, will be very small. The angular separation between two typical beams 6, and 19, shown in the figure, has been kept a little large for ease of viewing.

The beams 6, and 19, enter the box through the area, 25, and undergo multiple reflections inside the box. The path of the beam, 6, can be traced by going along the full line and that of the other beam, 19, by going along the broken line. The refractive indices of the materials constituting side, 29, cause reflection of the light beams falling on it, if the angles of incidence are above the critical angle. The angles of incidence of the beams falling for the first time on side, 29, are kept near the critical angle, yet larger than it, which cause the beams to be reflected from the side, 29. Because of the deviation of the mirror, 26, from perpendicularity by the small tilt angle, 27, the angle of incidence on side, 29, of the returning light beam which has been made to go round by sequential reflections from sides 29, 33, 35, and 26, is reduced from the previous value by the tilt angle, 27. Thus, the angle of incidence of the beam on side, 29, will decrease from its starting value on side, 29, by as many times the tilt angle, as the number of times the beam is made to go round through sequential reflections. When the angle of incidence of the beam comes within the critical angle of the side, 29, the beam is transmitted through the the side, 29, and falls on the information storage surface.

The full line and the broken line beams are transmitted through the side, 29, almost at the same angle of incidence, to fall on the storage surface, 30, at 31, and 32, because the angular deviation of the beams at the starting point at the mirror, 21, is very small. In the figure, the final separation distance between the beams given by the distance between 31, and 32, is larger than the distance where they entered the box at start. The entry angle of the beams and the location, 25, of the point of entry of the beams will have to be optimized to ensure large coverage of the area of the information storage surface, by the emerging beams from side, 29, yet ensuring that the beams proceed sequentially to the four mirrors, as shown by the beam paths in the figure. The access to information on the storage surface, 30, in the desired sequence is then easily achieved. When a large and fast display is desired, the information storage surface, 30, is replaced by a screen.

It is assumed that during the movements to the extreme positions of pzt, 3, the signal on pzt, 1, is held constant, but in another mode of operation both pzts can be made to move simultaneously. The beams deflected by the tilt of pzt, 3, will strike all points of the storage surface in between the points where the beams from the two extreme positions along 5, of the mirror, 21, strike. Change in the voltage on pzt, 1, will displace the beam in the direction of 2, and the displacement of pzt, 3, thereafter, will make the beams to cover all points along a different trajectory. Large area of the information storage surface is then scanned by the beams. Any desired point on the information storage surface can be accessed by the simultaneous application of the appropriate voltages to the two pzts, 3, and 1, to generate the needed tilt of the mirror, thus permitting fast random access to the storage surface.

The scan trajectories are more complex than indicated in the simplified illustration and description above. To obtain scan trajectories which may be standardised after evolution of the technology for two dimensional deflection of light beams using pzt assemblies, more complex movements of the mirror, 21, will be required, which will have to be ensured by appropriate design of the pzt assembly and combination of signals simultaneously applied on the pzts.

If one of the materials of side, 29, contributing to the refractive index has electro-optic properties which change the refractive index for change in applied electric field on the material, the transmittivity or reflectivity of the required regions of the side, 29, can be controlled, as desired, by changing the electrical field on the electro-optic material at those regions. If the material has accousto-optic properties which change the refractive index for change in applied strain on the material, the transmittivity and reflectivity of different regions of the side, 29, can be controlled by applying electircally generated accoustic signals.

It is preferable that the electric or accoustic signals be in synchronism with the light beam deflecting signals. Where the electro-optic or accousto-optic material is used and the refractive indices are controlled by electric or accoustic signals, all the sides of the reflecting box including the side, 26, can be kept perpendicular to the adjacent sides.

As mentioned before for FIG. 1, the scan trajectories will be more complex than have been indicated upto now. To obtain scan trajectories which may be standardised after evolution of the technology for two dimensional pzt deflected light beams, more complex movements of the mirror, 21, will have to be ensured by appropriate design of the pzt assembly and combination of signals simultaneously applied on the pzts. With the box reflector also, any desired point on the information storage surface can be accessed, by the simultaneous application of the appropriate voltages to the two pzts, 3, and 1, to generate the needed tilt of the mirror, thus permitting fast random access to the storage surface.

For both the configurations in FIG. 1, and FIG. 3, the reflectivity from points on the surface, 30, determines the nature of the information bit stored, as for present day optical disks. A suitably placed detector can read the scanned information. For information stored in the magnetic form, the striking light beams have to be polarized. The magnetic storage surface will change the direction of polarization of the reflected beams. The nature of the stored information on the surface is detected by passing the reflected beam through a polarization analyzer which forms part of the detector system. Writing is achieved with light beams by the methods given in the literature for both the optical disk and the magnetic disk, (Ref. Optical and Optoelectronic Computing, M. M. Mirsalehi, M. A. G. Abushagur and H. J. Caulfield, Advances in Computers, Ed. M. C. Yovits, Academic Press Inc., 1989). These arrangements are now well known and so are not shown in the drawings.

The described systems and possible variations have been mentioned in brief by way of illustrations only and many modifications and variations may be made within the scope of the appended claims.

I claim:

1. Access system selected for, information storage surface, display surface, according to use, comprising,
   a) means for deflection of a light beam at different angles, selected from one of two assemblies, one of which being an assembly of electrically driven piezo-electric transducers with mirror mounted on the assembly for the light beam to fall on the mirror, and the other of which being an assembly of electrically driven electro-optic materials shaped for deflecting the light beam while passing through the assembly, b) means for causing deflected light beams to enter into a geometrically shaped enclosure having means for causing multiple reflections in the enclosure, the enclosure having means for the light beams to exit from the enclosure, after increasing distance of separation of the beams at exit from the enclosure over distance of separation of the beams at entry to the enclosure, to illuminate the selected surface.

2. Access system as claimed in claim 1, wherein the enclosure is a long enclosure having an entrance for the light beams at one end and an exit for the light beams at another end, the enclosure causing the light beams entering the enclosure to exit from the enclosure after undergoing multiple reflections to increase the distance of separation of the beams at exit from the enclosure over distance of separation of the beams at entry to the enclosure, to illuminate the selected surface.

3. Access system as claimed in claim 1, wherein the enclosure is shaped like a box having:

a) one side at different angle with respect to each of its adjacent sides and angles constituted by other sides of the box being equal,
b) one side constituted from different materials to reflect or transmit the light beams depending on angles of incidence of the light beams on the side and critical angle of the side,
c) means to cause the light beams to enter from one side to undergo multiple reflections inside the box, to increase distance of separation of the beams at the exit from the enclosure over distance of separation of the beams at the entry to the enclosure, means to change angles of incidence of the light beams on the side which reflects or transmits the light beams, from higher values than the critical angle at start, to values within the critical angle after multiple reflections, and means for the light beams to exit out of the enclosure, to illuminate the selected surface.

* * * * *